UNITED STATES PATENT OFFICE.

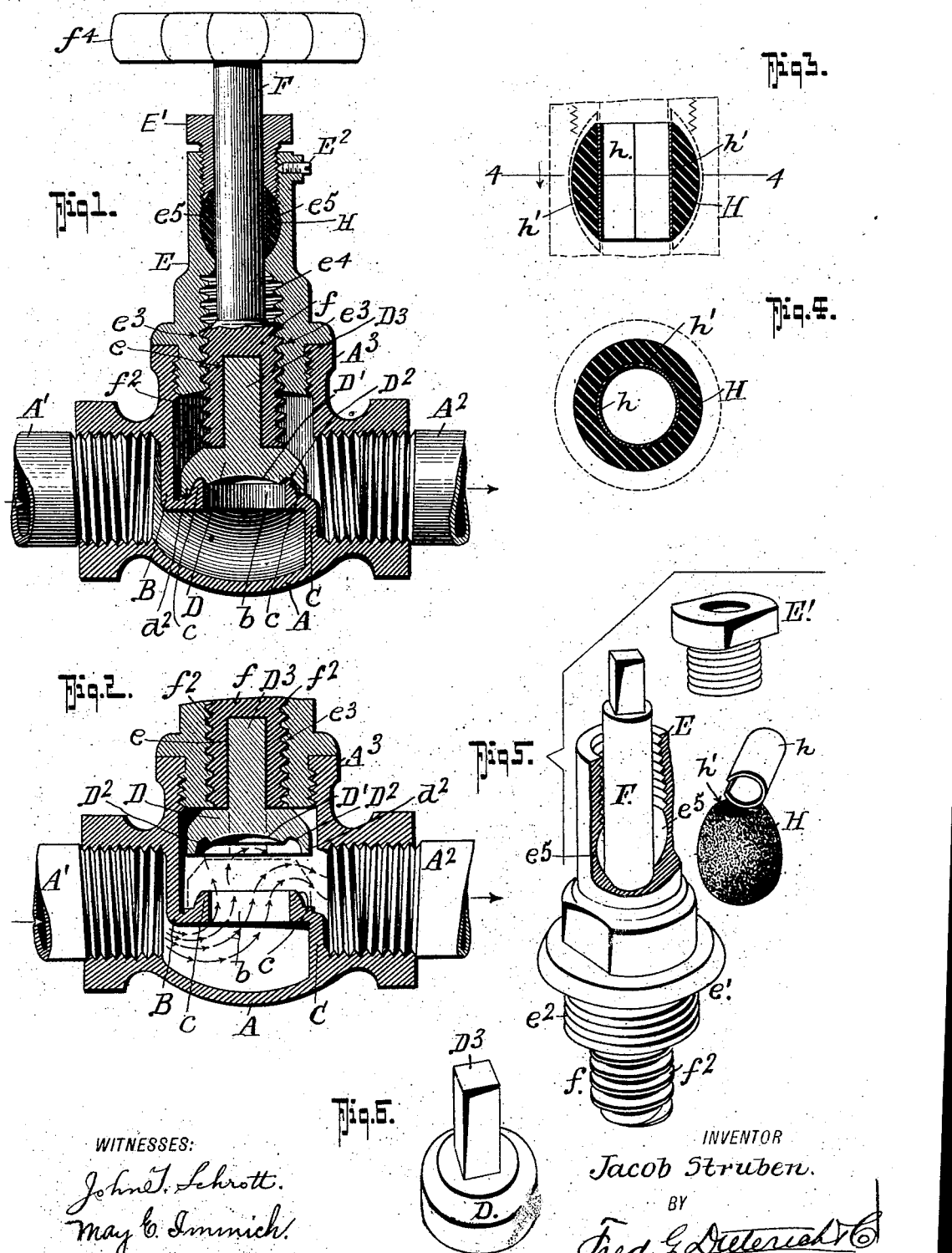

JACOB STRUBEN, OF KALAMAZOO, MICHIGAN.

GLOBE-VALVE.

No. 929,994.

Specification of Letters Patent.

Patented Aug. 3, 1909.

Application filed December 16, 1905. Serial No. 292,083.

*To all whom it may concern:*

Be it known that I, JACOB STRUBEN, residing in Kalamazoo, in the county of Kalamazoo and State of Michigan, have invented a new and Improved Globe-Valve, of which the following is a specification.

This invention, which relates to improvements in globe or check valves, and more particularly refers to that type of valves disclosed in my Patent No. 783,597 dated Feb. 28, 1905, has for its object to provide a valve of the type stated, in which the several parts are especially designed for effecting economy in the manufacture of the valve and whereby the several parts, when assembled, will be compactly held for positively seating to a closed position and for being readily adjustable and shiftable to the open position.

With other objects in view that will hereinafter appear, my invention embodies the valve construction hereinafter described in detail, specifically set out in the appended claims and illustrated in the accompanying drawings, in which:—

Figure 1, is a vertical section of my improved construction of valve, the same being closed. Fig. 2, is a similar view of the lower portion thereof, the valve head being shown as lifted from the seat by the steam pressure against the under side thereof. Fig. 3, is an enlarged detail of a vertical section of the packing gland for the valve stem, its normal or uncompressed form being indicated in dotted lines. Fig. 4, is a horizontal section on the line 4—4 of Fig. 3. Fig. 5, is a perspective view of the tubular valve standard, parts being broken away to show the location of the packing and its retainer member. Fig. 6, is a detail perspective view of the valve head.

In its practical construction, my improved valve includes a T-shaped casing A having the usual oppositely disposed inlet and outlet openings A′ and A², and the central tubular extension A³ midway the inlet and outlet ends, the said extension and inlet and outlet ends being internally threaded, as shown. At the inlet side, the casing A has a pendent wall B that has an inwardly projected flange $b$ and the said wall is of semicircular shape and merges with a similar wall C that extends upwardly from the casing bottom at the outlet end and which has a flange $c$, the flange members $c$ and $b$ forming the annular valve seat. By reason of forming the walls, C and B as shown, the flow of steam into the inlet end will be under the wall B and thence over the wall C to the outlet as clearly indicated by arrows 60 on Fig. 2.

Coöperating with the valve seat $c—b$ is a valve D that comprises a head having a concaved under face D′ and an annular seat D² surrounded by the pendent annular flange $d^2$, the said flange $d^2$ when the valve is down and on the valve seat surrounds the flange $b—c$ and aids in holding the valve head in true position. The valve D also includes a stem D³ for slidably engaging a socket $e$ in the lower or head end $f$ of the plunger F, the said head $f$ being externally threaded as at $f^2$ for reasons to be explained. It will be noticed that the inner or bearing face of the flange $d^2$ is beveled on the same angle that the seat face $c—b$ of the members B and C are beveled, such correlative arrangement of parts providing for a true resting or contacting of the valve head on the valve seat when at its closed position.

E designates the plug member of the valve casing, the lower end of which terminates in an extension $e'$ externally threaded as at $e^2$ for engaging the internal threads of the part A³ of the casing, and it also has internal threads $e^3$ to receive the threaded part $f^2$ of the head of the plunger F and the said plug has a socket $e^4$ for the reception of the upper end of the head $f$ when it is manually raised by turning the valve handle $f^4$. At the upper end the plug E is formed with a substantially spherical shaped socket $e^5$ to receive a flexible bushing for the stem of the valve adjuster F and which consists of a very thin metal sleeve $h$ mounted within the bore $h'$ of a rubber ball H. In practice, the sleeve and ball are fitted upon the stem F before the handle $f^4$ is attached thereto and the said ball H is compressed and caused to tightly bind in the socket $e^5$ by a screw cap E′ that enters the threaded end of the socket and which in turn is locked from working loose by a set screw E² that takes through the side of the plug E, as is clearly shown in Fig. 1. By providing the sleeve within the rubber ball H prevents the stem F from sticking during the adjustment of the valve and at the same time the ball H effects the desired packing about the stem and without making a too tight joint.

From the foregoing, taken in connection with the accompanying drawing, the complete construction and the advantages of my invention will be readily apparent to those skilled in the art to which the invention relates.

By reason of the peculiar construction of the several parts, it is manifest that when the stem F is screwed back, the steam in passing from the inlet to the outlet, holds the loosely mounted valve elevated to the point governed by the set of the stem F, the seat D' acting as a pocket to receive the steam pressure, as it were, centrally against the under side of the valve and thereby relieve its sleeve D³ from undue lateral strain within the socket in which it plays. When the valve is closed, as in Fig. 1, it firmly seats over the circular valve seat and effects a positive closing and in such manner that the valve is positively held from rattling or jumping on its seat.

Having thus described my invention, what I claim and desire to secure by Letters Patent is:—

1. In a valve of the character described, the combination with the valve casing, said casing having the oppositely disposed inlet and outlet ends and the central internally threaded neck, said casing having a pendent wall at the inlet end, and a vertically disposed wall at the outlet end, the ends of the said walls being curved and merged to form an annular valve seat, said seat having beveled bearing face, a plug having internal and external threads at the attaching end that fits in the central neck, said plug having a vertically extended socket, a valve stem slidably mounted in the plug having an externally threaded head portion for working in the socket of the plug, said stem carrying an enlarged externally threaded head for engaging the internal threads on the plug, the said stem head having a vertically extended socket and a valve having a stem that plays in the socket and formed with a head portion provided with an annular groove having a tapering seat for engaging the tapering portion of the valve seat, and a central concavity on its under side, all being arranged substantially as shown and for the purposes described.

2. A valve comprising a casing having the usual oppositely disposed inlet and outlet ends and the central internally threaded hub, said casing having a pendent wall adjacent the inlet and a vertically projected wall adjacent the outlet, the ends of said wall being curved inwardly and merging whereby to form an annular valve seat, a plug having a pendent extension internally and externally threaded, the external threads for engaging the internal threads of the casing hub, said plug having a central socket in its lower end and a socket in its upper end, a flexible packing that fits the said upper socket, a valve stem that slides through the packing, said stem having a head that rises into and is guided by the lower socket in the plug, said head having a vertically extended socket in its lower end, a valve having an annular groove in its under face to engage the annular valve seat and a stem that extends into the socket in the head end of the valve adjusting member.

3. In a valve of the character stated, the combination with a casing having the usual oppositely disposed inlet and outlet ends and a center internally threaded hub, said casing having a baffle wall at the inlet and a like wall at the outlet, the two forming an annular valve seat, and a valve having a stem and a head portion, the latter having an annular groove to engage the valve seat; of a plug having a pendent threaded hub that fits into the threaded hub of the casing and has an internal thread, said hub having a socket in its lower end and a substantially spherical socket in the upper end, an elastic packing member for fitting in the socket, a metallic sleeve that forms the bore of the packing, a valve stem that works through the bore, said stem having a head at the lower end, the upper end of which is adapted for sliding in the socket in the lower end of the plug and has a threaded portion for engaging the internal threads on the plug hub, said head having a socket to receive the valve stem.

JACOB STRUBEN.

Witnesses:
LEE T. BARKENBUS,
MARVIN J. SCHABERG.